(12) United States Patent
Derenski et al.

(10) Patent No.: US 8,498,834 B2
(45) Date of Patent: Jul. 30, 2013

(54) RADIO FREQUENCY ENERGY DEPOSITION ANALYSIS

(75) Inventors: Peter A. Derenski, Kirkwood, MO (US); Edward R. Winkler, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 598 days.

(21) Appl. No.: 12/691,928

(22) Filed: Jan. 22, 2010

(65) Prior Publication Data
US 2011/0180719 A1 Jul. 28, 2011

(51) Int. Cl.
*G01R 13/00* (2006.01)
*G01J 1/42* (2006.01)

(52) U.S. Cl.
USPC ............................................ 702/66; 250/395

(58) Field of Classification Search
USPC .............. 702/66, 57, 60, 67–68, 70, 75, 81, 702/84, 127, 150–153, 156, 159, 172, 182–183, 702/189; 324/309, 318–319, 322; 250/250, 250/305, 336.1, 339.07, 341.1, 393, 395; 600/410
See application file for complete search history.

(56) References Cited

U.S. PATENT DOCUMENTS

| | | | |
|---|---|---|---|
| 5,729,672 | A | 3/1998 | Ashton |
| 7,355,404 | B1 | 4/2008 | Hariharan et al. |
| 2005/0218896 | A1 | 10/2005 | Gortler |
| 2005/0264288 | A1 | 12/2005 | Campagna et al. |
| 2006/0047198 | A1 | 3/2006 | Sugimoto |
| 2008/0157765 | A1 | 7/2008 | Fontius et al. |

OTHER PUBLICATIONS

Balzano et al., Measurement of Equivalent Power Density and RF Energy Deposition in the Immediate Vicinity of a 24-GHz Traffic Radar Antenna, May 1995, IEEE Transactions on Electromagnetic Compatibility, vol. 37, No. 2, pp. 183-191.*
Crowther et al., Boeing 727-100 Test Project (High Energy Radiated Field Tests), Jul. 1989, DOT/FAA/CT-88/33, 148 pp.*
International Search Report and Written Opinion for PCT/US2010/061652 dated Apr. 15, 2011.

* cited by examiner

*Primary Examiner* — Toan Le
(74) *Attorney, Agent, or Firm* — Hope Baldauff, LLC (57) ABSTRACT

Radio frequency energy deposition analysis can include receiving information defining one or more radio frequency sources. Information defining one or more objects interacting with energy from the radio frequency sources may also be received. Ray traces of radio frequency energy from the radio frequency source to the object may be calculated. Ray traces of radio frequency energy reflected off of the object can also be calculated. Finally, the radio frequency energy deposited onto the object from the ray traces can be determined. The deposited energy may be graphically displayed and queried.

19 Claims, 7 Drawing Sheets

RADIO FREQUENCY ENERGY DEPOSITION ANALYSIS

FIELD OF THE DISCLOSURE

This disclosure relates generally to radio frequency systems analysis. This disclosure relates more specifically to a system for analyzing the deposition of energy upon objects within the operating fields of one or more radio frequency sources.

BACKGROUND

Radio frequency (RF) systems can deposit energy on objects in their operative environments. Analysis of the amount of energy deposited on given objects by given radio frequency sources can support determinations of safety and efficacy of many RF systems. For example, it may be useful to determine areas within an RF operating environment that exceed human tolerance thresholds. Testing and operation of the RF equipment may then be carried out while human safety is maintained. Similarly, the efficacy of an RF system to deposit a minimum threshold of energy in order to accomplish a specified result may be determined.

Traditional techniques for RF analysis use fixed sources and do not account for moving sources. Traditional techniques for RF analysis generally analyze only transmittance through surrounding materials and do not resolve the effects from multiple generations of reflections from objects in the analysis environment. Traditional techniques generally do not provide a graphical user interface (GUI) for manipulating the modeled scene and for selecting direct readings from any part of the objects within the scene.

SUMMARY

Concepts and technologies described herein support predicting levels of microwave energy deposited on and around one or more target objects from one or more fixed or moving RF energy sources. According to various embodiments of the technology presented herein, a method for analyzing radio frequency energy deposition includes receiving information defining a radio frequency source and information defining one or more objects. Ray traces of radio frequency energy are calculated from the radio frequency source to the object, as well as ray traces of radio frequency energy reflected off of the objects. Finally, the radio frequency energy deposited onto the object from the ray traces is calculated from the ray traces.

According to other embodiments of the technology presented herein, a computer system receives information defining a radio frequency source and location information associated with the radio frequency source. Information defining an object, which includes geometrical properties and material properties, is also received. Ray traces are calculated for radio frequency energy from the radio frequency source to the object, and for radio frequency energy reflected off of the object for reflections up to a specified number of generations of reflections. The radio frequency energy deposited onto the object from the ray traces is then calculated and a visual display of the radio frequency energy deposited onto the object is generated.

According to yet other embodiments of the technology presented herein, a computer system has a processing unit, a memory, and a program module. The computer system receives information defining a radio frequency source including frequency and power. Location information associated with the radio frequency source is received as well as information defining an object, including geometrical properties and material properties of the object. Ray traces of radio frequency energy are calculated from the radio frequency source to the object. Ray traces for the radio frequency energy reflected off of the object for reflections up to a specified number of generations are also calculated. The radio frequency energy deposited onto the object from the ray traces is then calculated and a visual display of the radio frequency energy deposited onto the object is generated. A graphical user interface is also provided for interacting with the visual display.

It should be appreciated that this Summary is provided to introduce a selection of concepts in a simplified form that are further described below in the Detailed Description. This Summary is not intended to be used to limit the scope of the claimed subject matter.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses analysis of energy deposition from radio frequency sources. This description is most readily understood with reference to the attached drawings, in which like reference numbers may appear in different drawings to refer to similar elements.

According to various embodiments described in detail below, a model for radio frequency deposition can predict an amount of energy deposited onto and around one or more objects or targets. The radio frequency energy can originate from one or more fixed or moving sources. The sources may be specified by their various radio characteristics, their location, and their motion. The sources may be any type of radio frequency emitters, such as those used for directed energy applications.

The model discussed herein may account for intervening materials, or objects, between the source and the target. The objects are defined as sets of polygons or tessellations of polygons. Each polygon may be defined as a type of material that is reflective, transmissive, absorptive, diffusive, specular, or so forth. The information defining the object can comprise geometrical properties defining the shape of the object, the material properties, and various other parameters related to the position and shape of the object and how it interacts with radio frequency energy.

Analysis results from application of the model may be used to provide a graphical output. The graphical output may display a representation of the operating environment of the RF sources that has been color coded. The color coding can display levels of deposited energy. A user query feature of the graphical output may support pointing to areas within the graphical output to manipulate the graphical output or to display numerical energy deposition levels and other parameters for the designated area.

Scenarios can be constructed for the model. A scenario can specify a type of object (for example, a box on a desk in a room, passengers in a vehicle, etc.), and a type of RF source. The scenario can also include motion definitions for the RF source, intervening structure, object material characteristics, and various other physical parameters. The scenario may be visualized as a camera image that can be rotated, tilted, manipulated, and expanded to observe the energy from any orientation. Such manipulation can support query energy deposition for anything within the scene, including the RF levels of objects inside or behind rooms, buildings, vehicles, or other objects.

Figure 1:
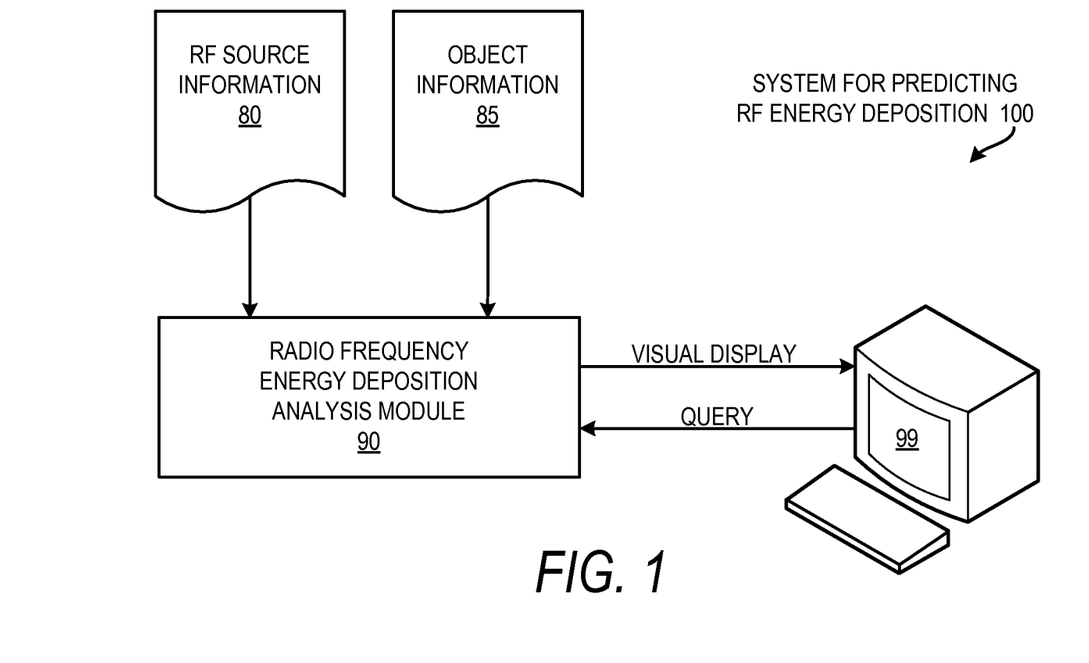
FIG. 1 is a block diagram illustrating a system for predicting radio frequency energy deposition according to embodiments presented herein.

Turning first to FIG. 1, a block diagram illustrates a system for predicting radio frequency energy deposition 100 according to embodiments presented herein. A radio frequency energy deposition analysis module 90 can receive radio frequency source information 80. The radio frequency source information 80 can include detailed information about one or more RF sources including power output, antenna gain, frequency, and motion characteristics. The radio frequency energy deposition analysis module 90 can also receive object information 85. The object information 85 can include one or more objects that may be defined as collections of polygons. Each polygon may be defined by its location, orientation, material characteristics, and other parameters. The material characteristics or an object or a polygon of an object can include information about the object's interaction with radio frequency energy. For example, the object may scatter, reflect, and/or absorb RF energy.

An object may be defined by an explicit collection of polygons or as one or more tessellations, or repeating surfaces, of polygons. An object can be described from scratch as a set of polygons or the object may be selected from a predefined library of objects. A library of objects may be provided for common instances of buildings, humans, walls, vehicles, and so forth.

The radio frequency energy deposition analysis module 90 can use the radio frequency source information 80 and the object information 85 to predict the amount of energy deposited on the objects from the RF sources. The deposited energy may be represented as a visual display on a terminal or computer 99. The computer 99 may also execute the radio frequency energy deposition analysis module 90, or the execution and visual display may occur on separate computing systems. The computer 99 may also issue a query from a user or other system to the radio frequency energy deposition analysis module 90.

The radio frequency energy deposition analysis module 90 can use ray tracing to determine the amount of energy deposited on each polygon of each object. The radio frequency energy deposition analysis module 90 can perform the ray traces using calculations according to laws governing electromagnetic phenomena of physical science. For example, the module 90 may calculate radio frequency energy propagation through a medium such as air, energy attenuation as a function of distance, energy attenuation from transmission through materials, scattering of energy, reflection of energy, absorption of energy, and other wave propagation and interaction phenomena.

Figure 2:
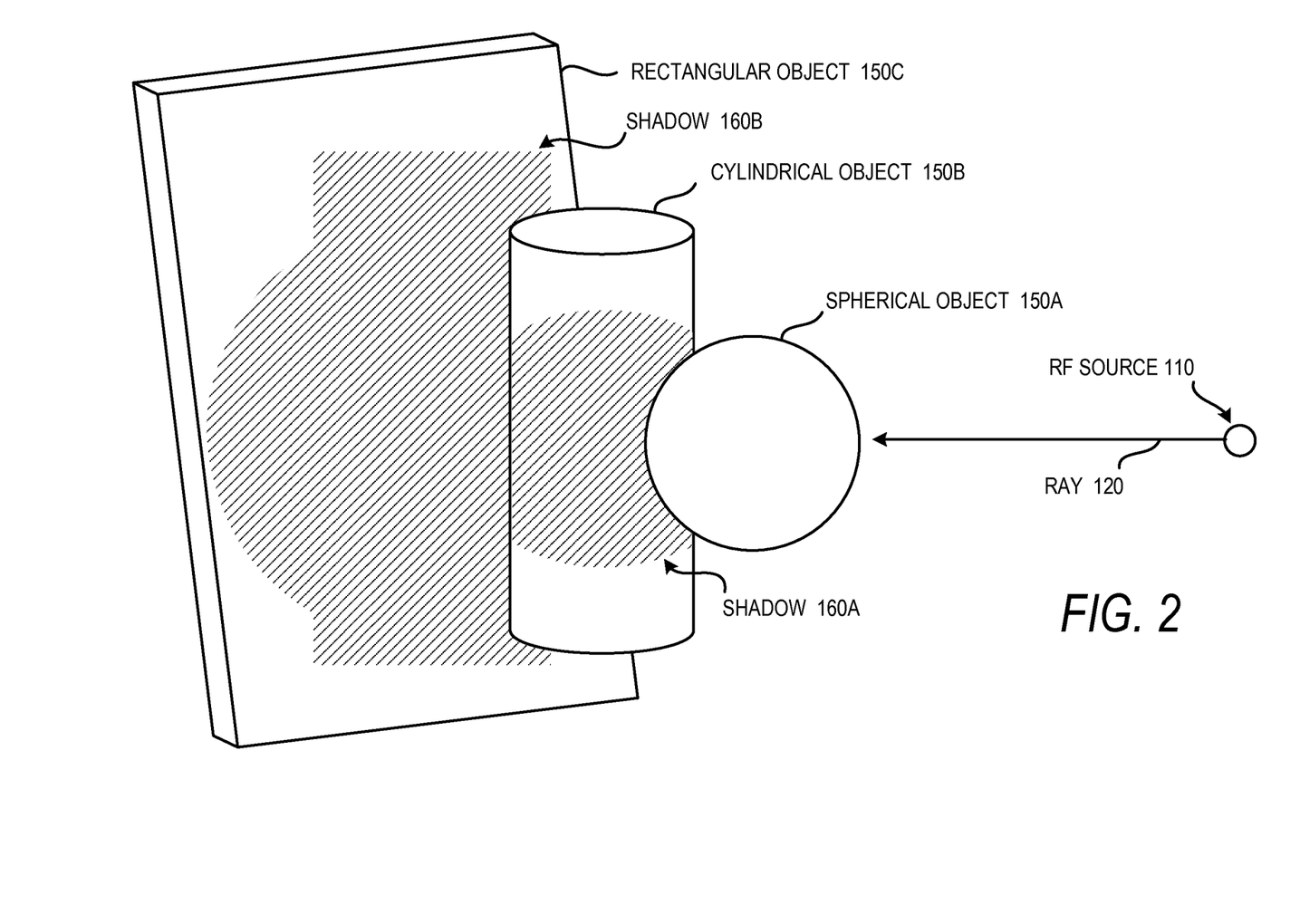
FIG. 2 is a schematic diagram illustrating energy deposition from a radio frequency source onto three objects according to embodiments presented herein.

Turning now to FIG. 2, a schematic diagram illustrates energy deposition from a radio frequency source 110 onto three example objects 150A-150C according to embodiments presented herein. Radio frequency energy is radiated from the radio frequency source 110. The energy can propagate in a directed fashion, such as ray 120, or may spread out in a conical fashion, or according to whatever radiation pattern is associated with the radio frequency source 110. The radio frequency energy may then interact with one or more objects 150A-150C in the operating environment of the radio frequency source 110.

The radio frequency energy may interact first with a spherical object 150A. Behind the spherical object 150A, the radio frequency energy may interact next with a cylindrical object 150B. The portion of the cylindrical object 150B blocked from the radio frequency source 110 by the spherical object 150A may receive less of the radio frequency energy as depicted by a shadow 160A. Behind the cylindrical object 150B, the radio frequency energy may interact next with a rectangular object 150C. The portion of the rectangular object 150C blocked from the radio frequency source 110 by the spherical object 150A and by the cylindrical object 150B may receive less of the radio frequency energy as depicted by a shadow 160B. The objects 150A-150C may be specified within the object information 85 as sets of polygons that can absorb radio frequency energy, transmit the energy, or reflect the energy in various ways. In addition to be defined as sets of polygons, such as triangles, the objects may be defined as tessellations of, or repeated sheets of, polygons.

The radio frequency source 110, or RF emitter, may be specified by its characteristics. These characteristics can include a location reference, a power output, an antenna gain, a frequency, and a pulse duration. According to embodiments, the location may be specified in meters, the power output in milliwatts, the antenna gain in dB, the frequency in hertz, and the pulse duration in seconds. Other units may be used respectively.

The location of the radio frequency source 110 may also be specified as a velocity, speed, direction, path of motion, and/or function of motion. According to embodiments, frames of motion may be defined such that one or more radio frequency sources 110, and one or more objects 150A-150C may be in motion relative to one another or relative to some external frame.

The analysis model discussed herein can use the information about the radio frequency source 110, such as power output, antenna gain, frequency, and motion characteristics, to predict the amount of energy deposited on the objects 150A-150C, or the surrounding area. The deposited energy may be displayed in a continuous graphical format for scientific or effectiveness analysis.

The technology presented herein may also provide a graphical display of the energy deposited on the objects 150A-150C. The graphical display may appear similar to FIG. 2 along with dynamic color coded output. A graphical user interface (GUI) may support queries from a user by pointing anywhere within the GUI display to receive spot reading details of the energy deposited in that area. In doing so, a user can point to a location or object and immediately receive an indication as to deposited energy level. The determined energy deposition at any location can be compared to specified threshold limits for human exposure safety and tolerance limits.

The ability to rapidly calculate and display an entire energy footprint while supporting moving sources and multi-surface reflections can provide a significant improvement to radio frequency energy deposition systems for modeling and analysis.

Figure 3:
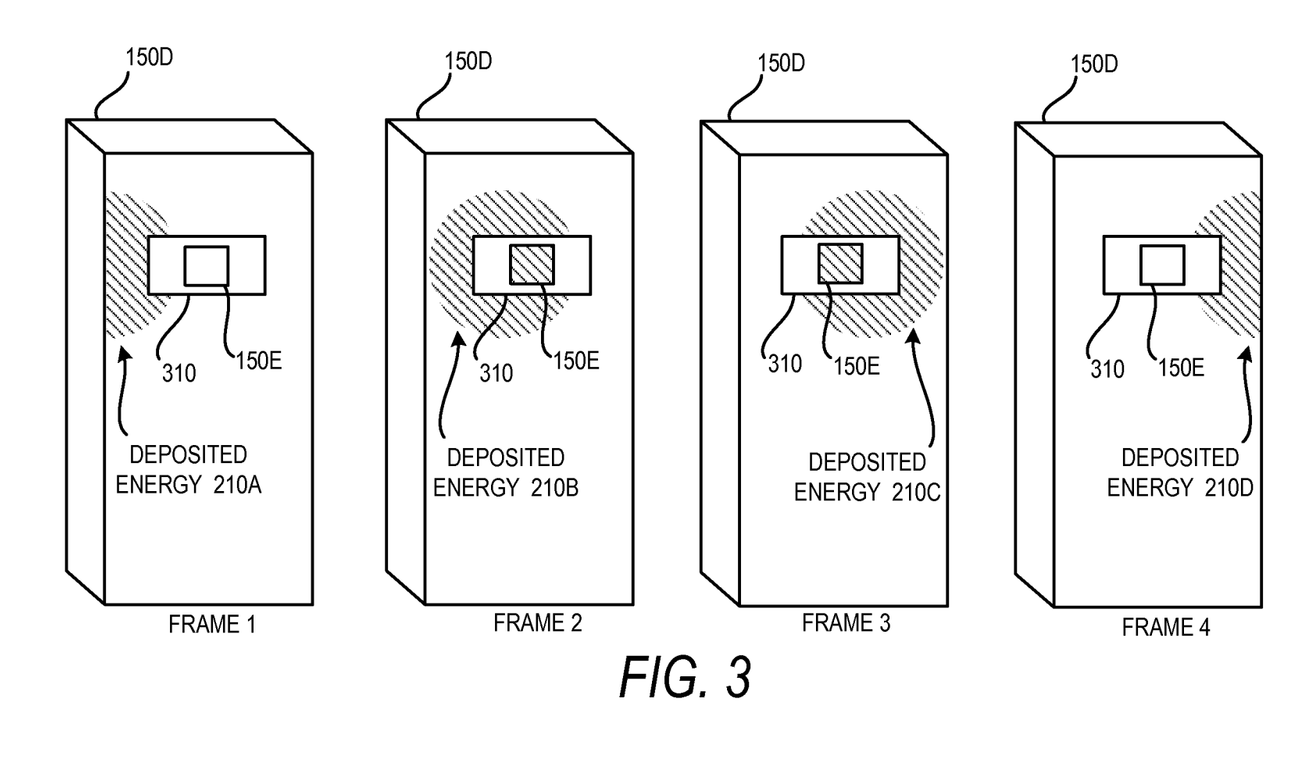
FIG. 3 is a schematic diagram illustrating frames of energy deposition from a moving radio frequency source according to embodiments presented herein.

Turning now to FIG. 3, a schematic diagram illustrates frames of energy deposition from a moving radio frequency source 110 according to embodiments presented herein. Frame 1, Frame 2, Frame 3, and Frame 4 in sequence, illustrate a rectangular object 150D as a moving radio frequency source 110 passes from left to right. The rectangular object 150D has an opening or a window 310. There is a smaller object 150E inside of the rectangular object 150D that is visible through the window 310 as illustrated in FIG. 3. Such a configuration may be used to model a building as the rectangular object 150D with a person or other object as the smaller object 150E inside the building.

The moving radio frequency source 110 can project radio frequency energy towards the rectangular object 150D starting towards the left in Frame 1 and ending towards the right in Frame 4. Accordingly, a region of deposited energy 210A-210D moves from the left in Frame 1 to the right in Frame 4. The smaller object 150E may show little or no deposited energy 210A in Frame 1 and then transition to having deposited energy 210B in Frame 2. In Frame 3, the smaller object 150E may continue to show deposited energy 210C and then in Frame 4 transition to showing little or no deposited energy 210D. As such, the radio frequency energy deposition analysis module 90 can determine that radio frequency energy passes through the window 310 of the rectangular object 150D to deposit onto the smaller object 150E as shown in Frame 2 and Frame 3.

The energy deposition within each frame can be calculated using a time varying definition for the radio frequency source 110. For example, a location specification for the radio frequency source 110 can vary in time as specified as a velocity, speed, direction, path of motion, and/or function of motion.

Scenarios can be constructed of specified object types. For example, a box on a desk in a room, passengers in a vehicle, or so forth. Each scenario may also specify radio frequency sources 110 including source type and motion. Intervening structure, and object material characteristics may also be specified in each scenario. Like a camera image, each scenario can be rotated, tilted, manipulated, and expanded to model and analyze the deposited energy from multiple orientations.

Figure 4A:
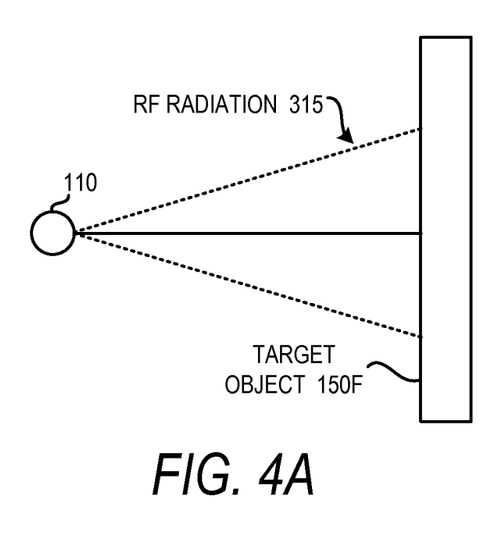
FIG. 4A is a schematic diagram illustrating radio frequency radiation directed from a radio frequency source onto a target object according to embodiments presented herein.

FIGS. 4A-4D illustrate examples of ray trace calculations used within the radio frequency energy deposition analysis module 90. Turning first to FIG. 4A, a schematic diagram illustrates radio frequency radiation 315 directed from a radio frequency source 110 to a target object 150F according to embodiments disclosed herein. The radio frequency radiation 315 can propagate from the radio frequency source 110 in a cone-shaped radiation pattern towards the target object 150F. Radio frequency energy may thereby be deposited on the target object 150F.

Objects, such as the target object 150F, can scatter, reflect, or absorb radio frequency energy depending upon the parameters of the objects representing the material properties of the objects. The objects may be constructed as polygons. The polygons may be arranged in triangular tessellation. Each triangle of tessellation can have associated parameters specifying the scattering, reflecting, and absorbing properties of the constituent polygons. Each tessellation may be described with a granularity, or fineness of resolution, for performing calculation of the analysis. For example, a large number may indicate a coarse level and a smaller number may specify a finer level of detail. Using multiple generations of reflections within the ray tracing of the analysis model can support tracking power contained in a reflection of energy from one object onto another.

Figure 4B:
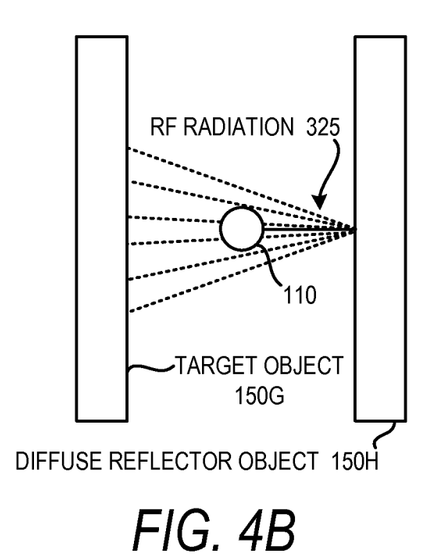
FIG. 4B is a schematic diagram illustrating radio frequency radiation directed from a radio frequency source onto a diffuse reflector object 150H according to embodiments presented herein.

Turning now to FIG. 4B, a schematic diagram illustrates radio frequency radiation 325 directed from a radio frequency source 110 onto diffuse reflector object 150H according to embodiments disclosed herein. The radio frequency radiation 325 can reflect, in a diffusive manner, from the diffuse reflector object 150H onto a target object 150G. Radio frequency energy may thereby be deposited on the target object 150G.

Figure 4C:
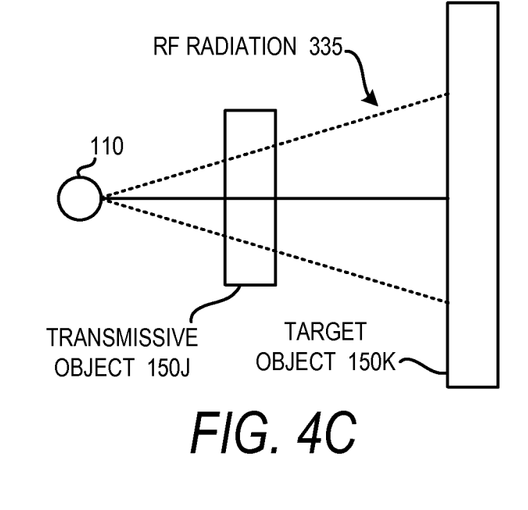
FIG. 4C is a schematic diagram illustrating radio frequency radiation directed from a radio frequency source through a transmissive object and onto a target object according to embodiments presented herein.

Turning now to FIG. 4C, a schematic diagram illustrates radio frequency radiation 335 directed from a radio frequency source 110 through a transmissive object 150J and onto a target object 150K according to embodiments disclosed herein. The radio frequency radiation 335 can propagate from the radio frequency source 110 in a cone-shaped radiation pattern through the transmissive object 150J and then onto the target object 150K. Radio frequency energy may thereby be deposited on the target object 150K.

Figure 4D:
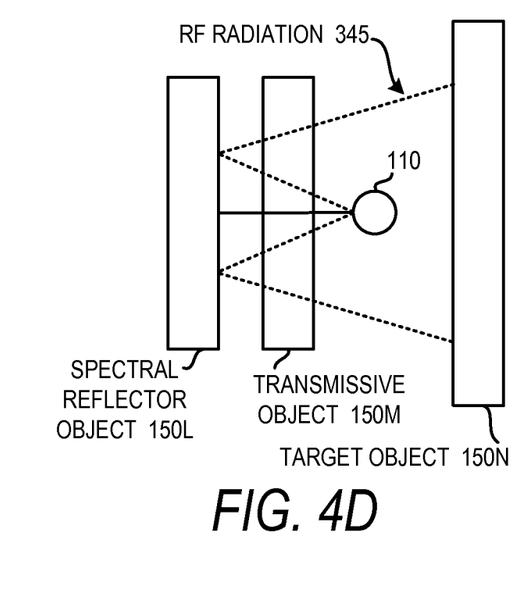
FIG. 4D is a schematic diagram illustrating radio frequency radiation directed from a radio frequency source through a transmissive object to reflect off of a spectral reflector object and then onto a target object according to embodiments presented herein.

Turning now to FIG. 4D, a schematic diagram illustrates radio frequency radiation 345 directed from a radio frequency source 110 through a transmissive object 150M to reflect off of a spectral reflector object 150L and then onto a target object 150N according to embodiments disclosed herein. Radio frequency energy may thereby be deposited on the target object 150N.

Figure 5:
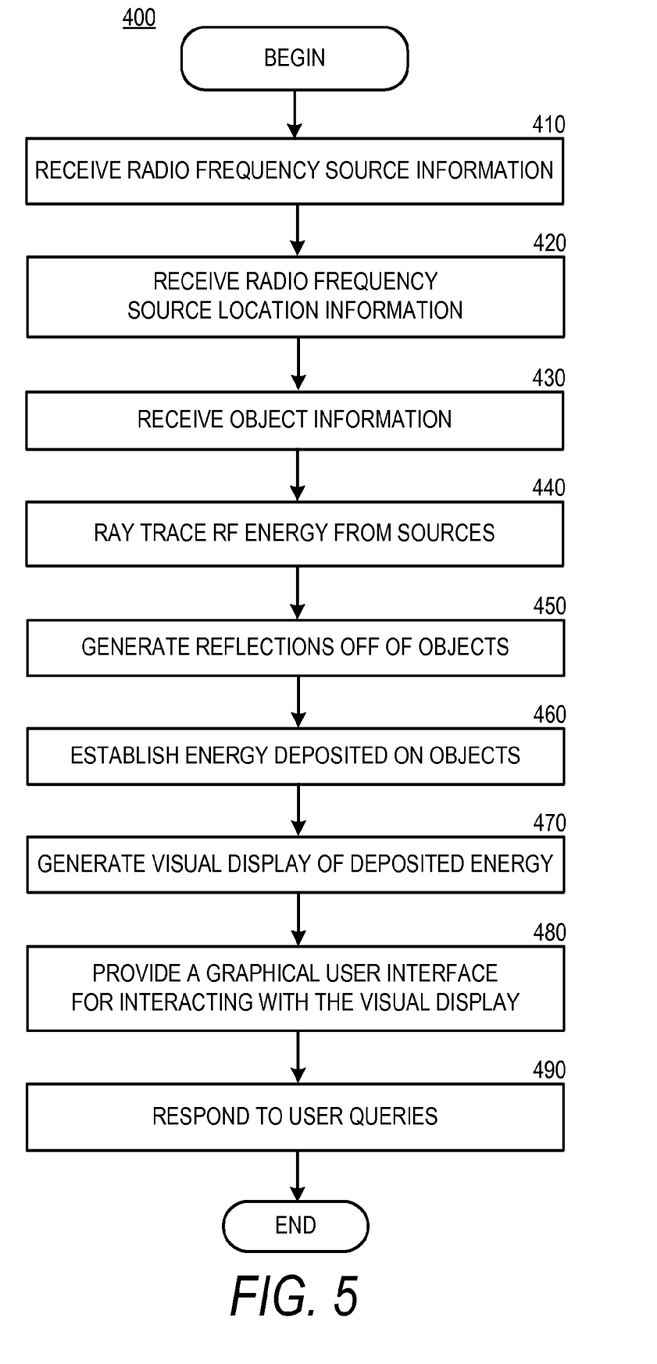
FIG. 5 is a logical flow diagram illustrating a process for energy deposition modeling and analysis according to embodiments presented herein.

Turning now to FIG. 5, additional details will be provided regarding the embodiments presented herein for radio frequency energy deposition analysis. In particular, FIG. 4 is a flow diagram showing a routine 400 that illustrates aspects of a process for energy deposition modeling and analysis according to embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 begins with operation 410, where a radio frequency energy deposition analysis module 90 receives information 80 about one or more radio frequency sources 110 to be analyzed. The radio frequency sources 110 may be directed energy emitters, such as those used in directed energy applications or electronic instrumentation jamming devices. The radio frequency sources 110 may be specified by their power, radio frequency, burst period, burst frequency, radiation pattern, bandwidth, or various other aspects or physical parameters. The power output at each of the radio frequency sources 110 may be a function of the electronics of the source and various antenna parameters associate with the source such as size, shape, gain, radiating patterns, and so forth. The radio frequency source information 80 may include a set of such parameters related to each radio frequency source. The radio frequency source information 80 may also include position, orientation, and motion information for each of the radio frequency sources 110.

At operation 420, the radio frequency energy deposition analysis module 90 receives location information for any, or all, of the radio frequency sources 110 associated with operation 410. The radio frequency sources 110 for which information was received in operation 410 may also be specified by their location. The location of a radio frequency source 110 may be static. The radio frequency source 110 may also be in motion, in which case the location may be specified as a velocity, speed, direction, path of motion, and/or function of motion.

At operation 430, the radio frequency energy deposition analysis module 90 may receive object information 85 defining one or more objects 150A-150N. The objects 150A-150N may be located within the operating field of the radio frequency sources 110 specified at operation 410. The objects 150A-150N may be defined as sets of polygons or tessellations of polygons. Each polygon may be defined within the object information 85 as a type of material that is reflective, transmissive, absorptive, diffusive, specular, or so forth.

At operation 440, the radio frequency energy deposition analysis module 90 can calculate ray traces for the radio frequency energy from the radio frequency sources 110 to the objects 150A-150N. The traced rays of radio frequency energy can be transmitted, reflected, absorbed, or otherwise interacted upon by the objects 150A-150N according to the defined material of the objects or the polygons making up the objects.

At operation 450, the radio frequency energy deposition analysis module 90 can calculate ray traces for radio frequency energy reflected off of the objects 150A-150N. The traced rays of radio frequency energy can be reflected between multiple surfaces or polygons of the various objects 150A-150N for several generations of reflections as specified by parameters of the model and/or parameters of the objects 150A-150N.

At operation 460, the radio frequency energy deposition analysis module 90 can establish the energy deposited on the various objects 150A-150N. Objects 150A-150N can accumulate energy from their interaction with the ray traced radio frequency energy of the radio frequency sources 110. The accumulated, or deposited, energy may be greater for objects that are absorptive and less for objects that are reflective or transmissive. The amount of energy deposited can be a function of parameters of the radio frequency energy as well as a function of the material, parameters, and area of the objects 150A-150N or polygons thereof. The parameters of the radio frequency energy may include frequency, duration, power, dispersion, angle, and so forth.

At operation 470, the radio frequency energy deposition analysis module 90 generates a visual display of the deposited energy. A visual image of the field of operation of the radio frequency sources 110 may be generated including all of the objects 150A-150N. Areas, or polygons, of the objects 150A-150N may be colored, shaded, textured, hatched, or otherwise visually distinguished according to the respective level of deposited energy associated with each area, region, or polygon. Such a visual representation can provide a user with a quick reference to visualize mapping of where energy is and is not being deposited within the operating environment.

At operation 480, the radio frequency energy deposition analysis module 90 can provide a GUI for interacting with the visual display generated in operation 470. The GUI can support queries from a user by pointing anywhere within the GUI display to receive spot reading details of the energy deposited in that area. The pointing may be performed using a mouse, touch interface, tablet, or any other pointing device. The GUI may also support manipulating the visual display in order to view the output from other angles, zooms, magnifications, cut away layers, rotations, or so forth.

At operation 490, the radio frequency energy deposition analysis module 90 can respond to user queries. User queries for specified energy deposits at specific points or over areas may be made using the GUI as discussed with respect to operation 480. User queries may also be issued using a command line interface, programming interface library, database style queries, or any other mechanism for request results or reports from the radio frequency energy deposition analysis module. After operation 490, the routine 400 may terminate or may be repeated periodically or continuously.

Figure 6:
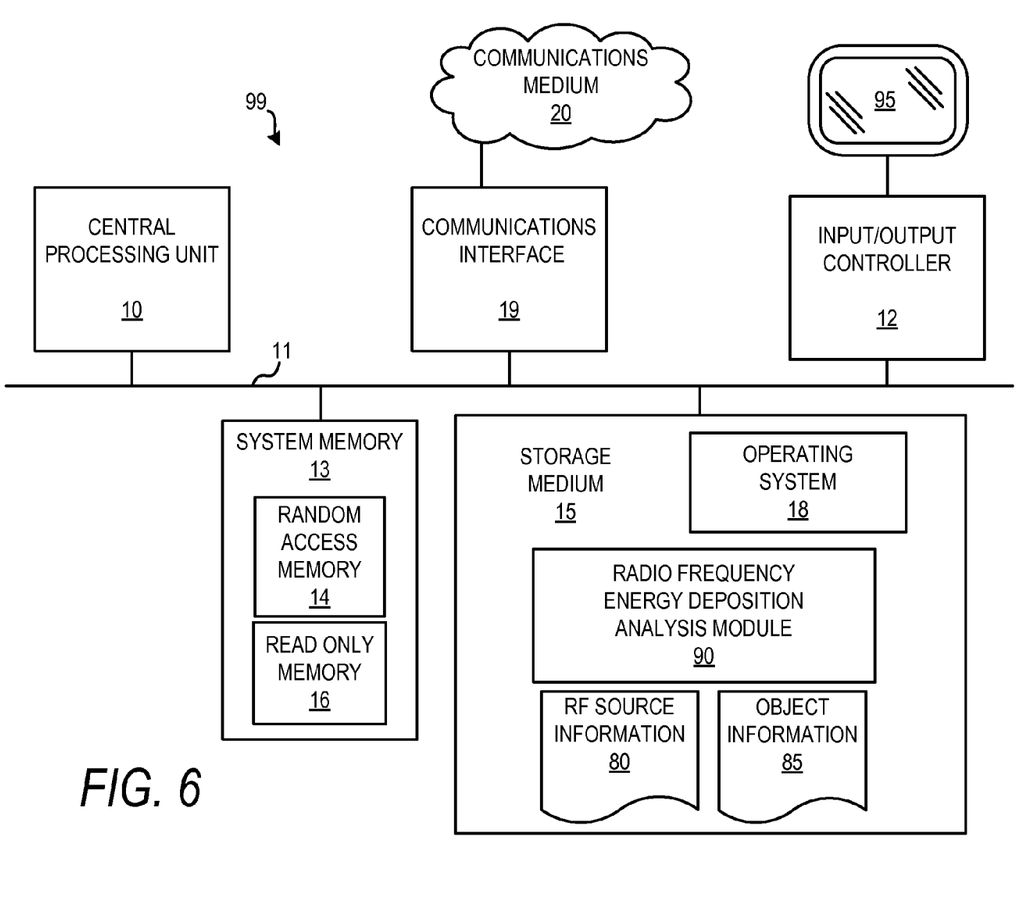
FIG. 6 is a computer architecture diagram illustrating computing system hardware capable of supporting radio frequency energy deposition analysis according to embodiments presented herein.

Turning now to FIG. 6, an illustrative computer architecture 99 can execute software components described herein for radio frequency energy deposition analysis. The computer architecture shown in FIG. 6 illustrates a computing system for executing a radio frequency energy deposition analysis module 90. The computer 99 may be utilized to execute aspects of the software components presented herein. It should be appreciated however, that the described software components can also be executed on other computing environments.

The computer 99 architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 99, such as during startup, can be stored in the ROM 16. The computer 99 may further include a storage medium 15 for storing an operating system 18, software, data, and various program modules to support energy deposition analysis techniques presented herein. These may include, for example, the radio frequency energy deposition analysis module 90, the RF source information 80, and the object information 85. The computer instructions may transform a processing unit, such as the CPU 10, to perform the functions disclosed herein for radio frequency energy deposition analysis.

The storage medium 15 can be connected to the CPU 10 through a storage controller (not illustrated) connected to the bus 11. The storage medium 15 may comprise computer-readable media configured to support non-volatile storage for the computer 99.

Although the description of computer-readable media contained herein refers to a storage device, such as non-volatile memory, it should be appreciated by those skilled in the art that computer-readable media can be any available computer storage media that can be accessed by the computer 99 or used to configure or load the computer 99. By way of example, and not limitation, these computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by, or used to configure, the computer 99.

The computer 99 may support logical connections to remote computers through a communications medium 20 such as a wireless radio command and control link. The computer 99 may connect to the communications medium 20 communications interface 19 connected to the bus 11.

The computer 99 may also include an input/output controller 12 for receiving and processing input from various devices, interfaces, or peripherals (not illustrated). Similarly, the input/output controller 12 may provide output to various devices, interfaces, or peripherals (also not illustrated). For example, a display 95 may support presenting the visual display of deposited RF energy as well as the associated GUI for manipulating and querying the visual display.

Based on the foregoing, it should be appreciated that technologies for modeling and analysis of radio frequency energy deposition analysis are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for analyzing radio frequency energy deposition, the method comprising:
    receiving, by a computing device, information defining a radio frequency source;
    receiving, by the computing device, information defining an object;
    calculating, by the computing device, a first set of ray traces of radio frequency energy from the radio source to the object;
    calculating, by the computing device, a second set of ray traces of radio frequency energy reflected off of the object for reflections up to a specified number of generations;
    calculating, by the computing device, radio frequency energy deposited onto the object from the first set of ray traces and the second set of ray traces;
    generating, by the computing device, a visual display of the radio frequency energy deposited onto the object, the visual display further including a visual display of the object; and
    visually distinguishing, by the computing device, associated areas within the object according to respective levels of deposited radio frequency energy.

2. The computer-implemented method of claim 1, wherein the information defining the radio frequency source comprises a frequency and a power associated with the radio frequency energy from the radio frequency source.

3. The computer-implemented method of claim 1, wherein the information defining the radio frequency source comprises location information.

4. The computer-implemented method of claim 1, wherein the information defining the radio frequency source comprises motion information.

5. The computer-implemented method of claim 1, wherein the information defining the object comprises geometrical information.

6. The computer-implemented method of claim 5, wherein the geometrical information comprises a set of polygons.

7. The computer-implemented method of claim 1, wherein the information defining the object comprises material properties of the object.

8. The computer-implemented method of claim 1, further comprising providing a graphical user interface for interacting with the visual display.

9. The computer-implemented method of claim 1, further comprising responding, by the computing device, to user queries associated with the calculated radio frequency energy deposited onto the object.

10. The computer-implemented method of claim 1, wherein the second set of ray traces comprises reflections up to a specified number of generations.

11. The computer-implemented method of claim 1, wherein calculating the radio frequency energy deposited onto the object comprises calculating, by the computing device, multiple frames corresponding to multiple times to support relative motion between the radio frequency source and the object.

12. A non-transitory computer-readable storage medium having computer-executable instructions stored thereon which, when executed by a computer system, cause the computer system to:
    receive information defining a radio frequency source;
    receive location information associated with the radio frequency source;
    receive information defining an object, wherein the information comprises geometrical properties and material properties;
    calculate first ray traces of radio frequency energy from the radio frequency source to the object;
    calculate second ray traces of radio frequency energy reflected off of the object for reflections up to a specified number of generations;
    calculate radio frequency energy deposited onto the object from the first and second ray traces;
    generate a visual display of the radio frequency energy deposited onto the object, the visual display further including a visual display of the object; and
    visually distinguish associated areas within the object according to respective levels of deposited radio frequency energy.

13. The computer-readable storage medium of claim 12, wherein the information defining the radio frequency source comprises a radiation pattern.

14. The computer-readable storage medium of claim 12, wherein the information defining the radio frequency source comprises motion information.

15. The computer-readable storage medium of claim 12, wherein the computer system is further caused to provide a graphical user interface for querying information associated with the visual display.

16. The computer-readable storage medium of claim 12, wherein the computer system is further caused to provide a graphical user interface for manipulating the visual display.

17. The computer-readable storage medium of claim 12, wherein calculating the radio frequency energy deposited onto the object comprises calculating multiple frames corresponding to multiple times to support relative motion between the radio frequency source and the object.

18. A computer system comprising:
   a processing unit;
   a memory operatively coupled to the processing unit; and
   a program module which executes in the processing unit from the memory and which, when executed by the processing unit, causes the computer system to:
      receive information defining a radio frequency source, wherein the information defining the radio frequency source comprises frequency and power,
      receive location information associated with the radio frequency source,
      receive information defining an object, wherein the information comprises geometrical properties and material properties,
      calculate first ray traces of radio frequency energy from the radio frequency source to the object,
      calculate second ray traces of radio frequency energy reflected off of the object for reflections up to a specified number of generations,
      calculate radio frequency energy deposited onto the object from the first and second ray traces,
      generate a visual display of the radio frequency energy deposited onto the object, the visual display further including a visual display of the object,
      visually distinguish associated areas within the object according to respective levels of deposited radio frequency energy, and
      provide a graphical user interface for interacting with the visual display.

19. The computer system of claim 18, wherein the information defining the radio frequency source comprises motion information.

* * * * *